(12) United States Patent
Slivka et al.

(10) Patent No.: US 10,944,316 B2
(45) Date of Patent: Mar. 9, 2021

(54) CIRCUIT ADAPTED TO DETECT APPLIED VOLTAGE AND/OR VOLTAGE DEPENDENT CONDITIONS

(71) Applicant: Crestron Electronics, Inc., Rockleigh, NJ (US)

(72) Inventors: Benjamin Slivka, Hillsdale, NJ (US); Martin Koenig, New York, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 4 days.

(21) Appl. No.: 16/248,896

(22) Filed: Jan. 16, 2019

(65) Prior Publication Data
US 2020/0227996 A1 Jul. 16, 2020

(51) Int. Cl.
*H02M 1/08* (2006.01)
*H05B 47/10* (2020.01)

(52) U.S. Cl.
CPC ............ *H02M 1/083* (2013.01); *H05B 47/10* (2020.01)

(58) Field of Classification Search
CPC ........ H02M 1/083; H02M 7/12; H05B 47/10; H05B 47/14; H05B 45/31; H05B 39/044
See application file for complete search history.

(56) References Cited

U.S. PATENT DOCUMENTS

| | | | |
|---|---|---|---|
| 5,942,860 A * | 8/1999 | Huynh | H05B 41/2928 315/224 |
| 2010/0079077 A1 * | 4/2010 | Imam | H05B 39/08 315/224 |
| 2013/0113381 A1 * | 5/2013 | Cai | H05B 45/46 315/122 |
| 2013/0257406 A1 * | 10/2013 | Hausman, Jr. | H05B 45/37 323/300 |

(Continued)

OTHER PUBLICATIONS

Bristolwatch, http://www.bristolwatch.com/ele2/zero_crossing.htm; date available online: Feb. 13, 2018 (Year: 2018).*

*Primary Examiner* — Borna Alaeddini
(74) *Attorney, Agent, or Firm* — Crestron Electronics, Inc.

(57) ABSTRACT

A circuit adapted to detect applied voltage and/or voltage based conditions. The circuit comprises a zero-cross detection circuit and a controller. The zero-cross detection circuit is adapted to output a zero-cross signal comprising zero-cross events based on an applied alternating current power signal. The controller is adapted to store a relationship between a pulse width delta, frequency, and voltage. The controller is adapted to sense the zero-cross signal from the zero-cross detection circuit to determine its frequency and pulse width delta by calculating a difference between a high-time and a low-time of the zero-cross signal, and determine the applied voltage based on the stored relationship. The controller can adjust at least one setting of the circuit based on the determined applied voltage, such as the timing of a dimming circuit. In another embodiment, the controller may directly detect voltage based conditions, such as zero-cross delays a dimmer circuit. The controller is adapted store a relationship between a pulse width delta and zero-cross signal delay. The controller is adapted to receive the zero-cross signal from the zero-cross detection circuit, determine a pulse width delta, and determine a zero-cross delay based on the determined pulse width delta and the stored relationship.

30 Claims, 8 Drawing Sheets

(56) References Cited

U.S. PATENT DOCUMENTS

| | | | |
|---|---|---|---|
| 2015/0171762 A1* | 6/2015 | Chen | H02M 5/2573 |
| | | | 323/311 |
| 2015/0373817 A1* | 12/2015 | Zotter | H05B 39/048 |
| | | | 315/224 |
| 2018/0116020 A1* | 4/2018 | Beghelli | H03K 17/941 |
| 2018/0160494 A1* | 6/2018 | Vanderzon | H05B 45/10 |

* cited by examiner

CIRCUIT ADAPTED TO DETECT APPLIED VOLTAGE AND/OR VOLTAGE DEPENDENT CONDITIONS

BACKGROUND OF THE INVENTION

Technical Field

The present invention generally relates to load control devices, and more specifically to a circuit adapted to automatically detect applied voltage and/or voltage dependent conditions, such as the zero-cross delay, and as a result change at least one of its settings. For example, a dimmer implementing such a circuit may be adapted to adjust its operation at different voltage levels.

Background Art

Dimmers are used for varying light levels or intensity of lighting loads by controlling the amount of power that is delivered to the loads. Dimmers are typically connected via wiring to alternating current (AC) mains power supply to receive an AC power hot signal and output a dimmed hot output signal to a load based on the desired dimming level. Phase control dimming is one method of dimming lighting loads. Supplied with a sine waveform voltage signal, phase control dimming involves varying the amount of time voltage is applied to the load during each half cycle.

Figure 6A:
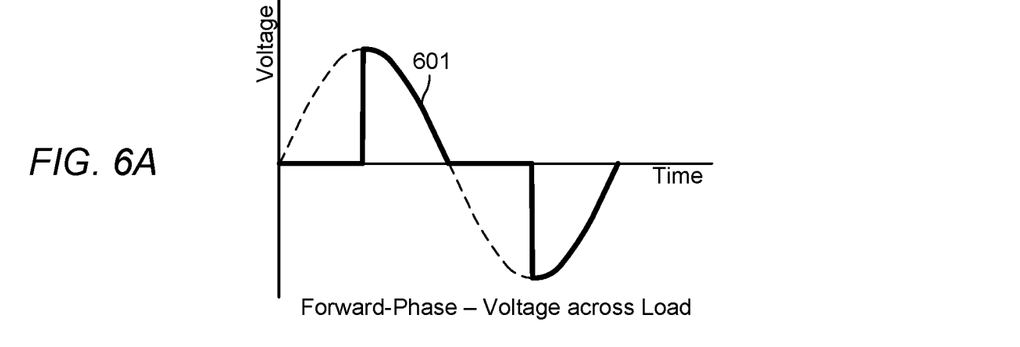
FIG. 6A shows an exemplary voltage waveform of a forward phase dimmed hot output signal across the load in accordance with an illustrative embodiment.
Figure 6B:
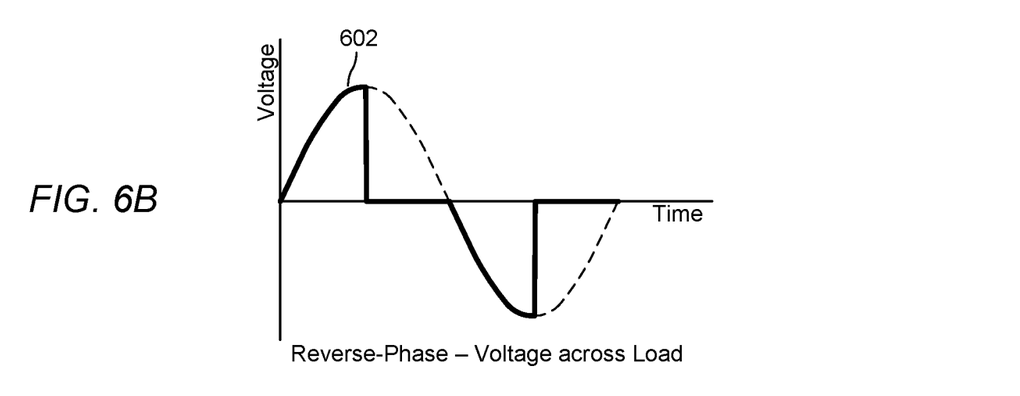
FIG. 6B shows an exemplary voltage waveform of a reverse phase dimmed hot output signal across the load in accordance with an illustrative embodiment.

Phase control dimming generally utilizes forward phase dimming (also called leading edge) or reverse phase dimming (also called trailing edge), although center phase dimming is also available. During forward phase dimming, as shown in FIG. 6A, the dimmer turns off power during the front part of each half cycle (i.e., it is off at zero crossing and turns on during the half cycle). In reverse phase dimming, as shown in FIG. 6B, the dimmer turns off power during the rear part of each half cycle (i.e., it is on at zero crossing and turns off during the half cycle).

To properly phase dim a load, the dimmer phase control timing needs to be synchronized with the incoming AC power hot signal. However, circuits used to synchronize with the AC line can have a propagation zero-cross delay that can cause timing errors in the dimmer circuit. At a known incoming voltage this zero-cross delay is typically accounted for by assuming a nominal predetermined delay value. However, this zero-cross delay changes as the applied voltage changes. In addition, different voltages can affect other items, such as: overcurrent trip values, rise/fall times of a dimmer field-effect-transistor (FET), or how the dimmer protects the attached load from an over voltage applied to the device.

The voltage of the incoming AC power hot signal may differ as a function of regions and applications. Typically, in North America the AC mains power supply is 120 Volts (V) at 60 Hertz (Hz) frequency. In large commercial installations, the voltage may be higher, such as 240 V or 277 V. In other regions, such as Europe, 230V at 50 Hz frequency AC mains power is used. The range of available AC mains power supplies is problematic, as dimmers are typically designed to support a single voltage level and may not operate with, or may be damaged by, other voltage levels. While accidental use of appliances with incompatible voltage levels is solved with different plugs and socket configurations, dimmers are hard wired. As such, special care needs to be taken in selecting the right dimmer that is rated for a particular voltage level to avoid damage to the dimmer and/or the lighting load.

Universal voltage dimmers have been introduced to obviate the need to select a specific voltage dimmer. Some such dimmers may use various detection circuit components to automatically detect the incoming voltage. This normally requires the usage of several large and potentially costly components, including resistors that are rated to hold off these higher voltages and an analog-to-digital converter (ADC). In applications where the dimmer size needs to be small due to functional and esthetic reasons, for example in dimmers that need to fit inside a wall box, the addition of numerous additional and large components is undesired and increases cost.

Accordingly, a need has arisen for a universal dimmer that automatically detects the incoming voltage, and/or voltage dependent conditions, without the addition of excessive circuit components.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a universal dimmer that automatically detects the incoming voltage and/or voltage dependent conditions in a manner which obviates or minimizes problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Disclosure of Invention

According to one aspect of the embodiments, a dimmer circuit is provided adapted to operate at different applied voltage levels. The dimmer circuit comprises a zero-cross detection circuit, a dimming circuit, and a controller. The zero-cross detection circuit is adapted to output a zero-cross signal comprising zero-cross events based on an applied alternating current power signal. The dimming circuit is adapted to provide a dimmed hot output signal to a load. The controller is adapted to: store a relationship between pulse width delta and zero-cross delay; receive the zero-cross signal from the zero-cross detection circuit; determine a pulse width delta by calculating a difference between a high-time and a low-time of the zero-cross signal; determine a zero-cross delay based on the determined pulse width delta and the stored relationship between the pulse width delta and zero-cross delay; and adjust at least one setting of the dimming circuit based on the determined zero-cross delay.

According to an embodiment, the zero-cross detection circuit comprises a series impedance, a low-pass filter, and an isolator. The zero-cross detection circuit may also comprise at least one capacitor, at least one resistor, and an optical isolator. According to another embodiment, the zero-cross detection circuit comprises at least one capacitor, at least one resistor, and a comparator. According to an embodiment, the zero-cross detection circuit comprises an opto-isolator including a light emitting diode and a phototransistor, wherein the light emitting diode is connected to a series impedance and a low-pass filter, wherein a collector of the phototransistor is connected to a pull up resistor and to the controller to provide the zero-cross signal.

According to an embodiment, the stored relationship between pulse width delta and zero-cross delay is substantially linear. According to an embodiment, the stored relationship may comprise the following formula:

$$\text{Zero-Cross Delay} = D\_Slope \times PW\_Delta + D\_Offset$$

where,
PW_Delta is the pulse width delta;
D_Slope is a slope coefficient; and
D_Offset is the constant offset value.

According to one embodiment, the stored relationship between pulse width delta and zero-cross delay is predetermined based on the types and values of the zero-cross detection circuit components. According to another embodiment, the stored relationship between pulse width delta and zero-cross delay is stored as one of a formula, a table, and any combinations thereof.

According to an embodiment, the at least one setting comprises a timing of the dimmer circuit.

According to another aspects of the embodiments, a circuit is provided adapted to determine a voltage level of an applied alternating current power signal. The circuit comprises a zero-cross detection circuit and a controller. The zero-cross detection circuit is adapted to output a zero-cross signal comprising zero-cross events based on an applied alternating current power signal. The controller is adapted to: store a relationship between pulse width delta, frequency, and voltage; receive the zero-cross signal from the zero-cross detection circuit; store or determine a frequency of the zero-cross signal; determine a pulse width delta by calculating a difference between a high-time and a low-time of the zero-cross signal; and determine an applied voltage based on the determined pulse width delta, the stored or determined frequency, and the stored relationship between pulse width delta, frequency, and voltage.

According to an embodiment, the zero-cross detection circuit comprises a series impedance, a low-pass filter, and an isolator. According to another embodiment, the zero-cross detection circuit comprises at least one capacitor, at least one resistor, and an optical isolator. According to a further embodiment, the zero-cross detection circuit comprises at least one capacitor, at least one resistor, and a comparator. In addition, the zero-cross detection circuit may comprise an opto-isolator including a light emitting diode and a phototransistor, wherein the light emitting diode is connected to a series impedance and a low-pass filter, wherein a collector of the phototransistor is connected to a pull up resistor and the controller to provide the zero-cross signal.

According to an embodiment, the stored relationship between pulse width delta, frequency, and voltage comprises a plurality of formulas each for a predetermined frequency and each comprising a function of pulse width delta and voltage. According to an embodiment, the controller is adapted to choose a formula from the plurality of formulas based on the stored or determined frequency and calculate the applied voltage using the chosen formula and the determined pulse width delta. Each formula may comprise a relationship between pulse width delta and voltage that is substantially linear. According to an embodiment, each formula for each predetermined frequency comprises:

$$\text{Applied Voltage} = V\_Slope \times PW\_Delta + V\_Offset$$

where,
PW_Delta is the pulse width delta;
V_Slope is the slope coefficient;
V_Offset is the constant offset value.

According to an embodiment, each formula is predetermined based on the types and values of the zero-cross detection circuit components. According to another embodiment, the stored relationship between pulse width delta, frequency, and voltage is stored as one of a formula, a plurality of formulas, a table, and any combinations thereof.

According to an embodiment, the controller is further adapted to adjust at least one setting of the circuit based on the determined voltage level. According to an embodiment, the at least one setting comprises timing of the circuit. According to an embodiment, adjusting at least one setting further comprises determining whether the determined voltage level is supported by the circuit. According to an embodiment, when the determined voltage level is not supported by the circuit, the controller is adapted to (a) disable an operation of the circuit, or (b) issue an error signal. According to various embodiments, the at least one setting may comprises an overcurrent trip threshold value, a current limit of the circuit, or a rise time and a fall time of the circuit.

According to another aspect of the embodiments, a circuit is provided adapted to determine a voltage dependent condition value based on an applied alternating current power signal. The circuit comprises a zero-cross detection circuit and a controller. The zero-cross detection circuit is adapted to output a zero-cross signal comprising zero-cross events based on an applied alternating current power signal. The controller is adapted to: store a relationship between pulse width delta and voltage dependent condition; receive the zero-cross signal from the zero-cross detection circuit; determine a frequency of the zero-cross signal; determine a pulse width delta by calculating a difference between a high-time and a low-time of the zero-cross signal; and determine a voltage dependent condition value based on the determined pulse width delta and the stored relationship between pulse width delta and voltage dependent condition.

According to a further aspect of the embodiments, a circuit is provided adapted to operate at different applied voltage levels. The circuit comprises a zero-cross detection circuit and a controller. The zero-cross detection circuit is adapted to output a zero-cross signal comprising zero-cross events based on an applied alternating current power signal. The controller is adapted to: store a relationship between pulse width delta and zero-cross delay; receive the zero-cross signal from the zero-cross detection circuit; determine a pulse width delta by calculating a difference between a high-time and a low-time of the zero-cross signal; determine a zero-cross delay based on the determined pulse width delta and the stored relationship between the pulse width delta and zero-cross delay; and adjust at least one setting of the circuit based on the determined zero-cross delay.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

Brief Description of the Several Views of the Drawings

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be implemented in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one of the embodiments. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Dimmer
101 Alternating Current (AC) Power Hot Signal
102 Dimmed Hot Output Signal
103 Load
104 AC Power Source
105 Alternating Current (AC) Power Neutral Signal
200 Dimmer Circuit
201 Zero-cross Signal
202 Series Impedance
204 Filter
206 Isolator
207 High-Voltage Side
208 Low-Voltage Side
210 Controller
211 Isolated Dimming Circuit
212 Drive Signal
230 Zero-cross Detection Circuit
300 One Embodiment of a Zero-cross Detection Circuit
301 Dielectric Barrier
302 Resistor R1
303 Resistor R2
304 Resistor R3
305 Capacitor C1
306 Opto-isolator
307 Light Emitting Diode (LED)
308 Phototransistor
309 Diode D1
310 Zero-cross Output
311 Low-Voltage Power Source
312 Ground
315 Resistor R4
400 AC Voltage Waveform of the AC Power Hot Signal Fed into the Dimmer
401 Positive Half Cycle
402 Negative Half Cycle
403 Voltage Threshold Value
405 Rising Zero-Cross
406 Falling Zero-Cross
410 Square Voltage Waveform of the Zero-Cross Signal Used To Detect the Pulse Width Delta
411 Detected Rising Zero-Cross Event
412 Detected Falling Zero-Cross Event
415 Low-Time
416 High-Time
418 First Additional High-Time
419 Second Additional High-Time
501 Graph
502 Relationship between the Pulse Width Delta and the Applied Voltage
505 Graph 506 Relationship between the Zero-Cross Delay (i.e., the time between the rising edge of the AC waveform 400 and the falling edge of the zero cross waveform 410) and the Pulse Width Delta
601 Voltage Waveform of a Forward Phase Dimmed Hot Output Signal across the Load
602 Voltage Waveform of a Reverse Phase Dimmed Hot Output Signal across the Load
700 Flowchart Illustrating the Steps for a Method of Determining the Applied Voltage
702-714 Steps of Flowchart 700
800 Flowchart Illustrating the Steps for a Method of Determining the Zero-Cross Delay
802-812 Steps of Flowchart 800

LIST OF ACRONYMS USED IN THE SPECIFICATION IN ALPHABETICAL ORDER

The following is a list of the acronyms used in the specification in alphabetical order.
kΩ Kilo Ohm
μF Microfarad
μs Microseconds
AC Alternating Current
ADC Analog-to-Digital Converter
ASIC Application Specific Integrated Circuit
C Capacitor
CTR Current Transfer Ratio
D Diode
DC Direct Current
dV/dt Voltage Derivation Over Time
EEPROM Electrically Erasable Programmable Read-Only Memory
FET Field-Effect Transistor
Hz Hertz
LED Light Emitting Diode
PCB Printed Circuit Board
R Resistor
RAM Random-Access Memory
ROM Read-Only Memory
TRIAC Triode for Alternating Current
V Volts/Voltage Mode(s) for Carrying Out the Invention For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamline technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

According to an embodiment, a dimmer is disclosed that automatically determines the voltage applied to the device and/or voltage dependent conditions by detecting a pulse width delta at the output of a zero-cross detection circuit. Using the present embodiments, a universal dimmer may be provided that can be installed in various locations with a wide range of voltage levels of the provided AC power supply—for example, it can be powered by power supplies with voltages of 100 V all the way to 277V. In addition to adjusting the phase delay, knowing the voltage applied to the dimmer also allows the dimmer to adjust its overcurrent trip values, rise/fall times of a dimmer field-effect-transistor (FET), and to protect an attached load from an overvoltage applied to the device, among other benefits. Beneficially, the detection circuit and method described herein simplifies the dimmer circuit design, reduces the printed circuit board (PCB) real estate and thereby dimmer size, and saves cost.

While the different aspects of the embodiments described herein pertain to the context of load control devices, they are not limited thereto, except as may be set forth expressly in the appended claims. For example, the below described zero-cross detection circuit and methods may also be used in other applications where the detection of applied voltage and/or voltage dependent conditions is desired. The zero-cross detection circuit may be incorporated in the circuitry of any AC powered device in order to detect voltage and/or voltage dependent conditions, and in response change the operation of the device. For example, the zero-cross detection circuit may be incorporated in a device to enable it to detect incoming voltage and switch operation based on whether it is used in Europe or the United States.

Figure 1:
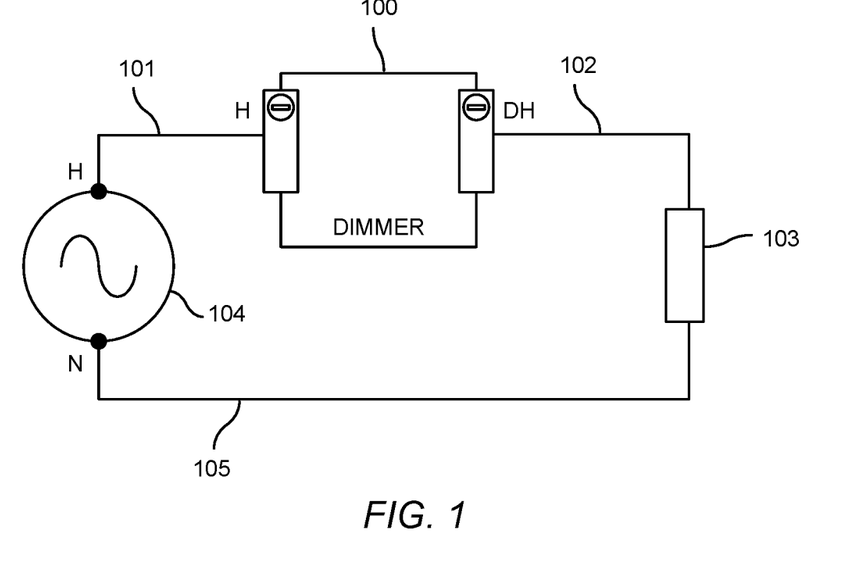
FIG. 1 shows a dimmer in accordance with an illustrative embodiment.

FIG. 1 shows a dimmer 100 in accordance with an illustrative embodiment. The dimmer 100 may be connected in series with an alternating current (AC) power source 104, such as an AC mains power source, to receive electric AC power hot signal 101. The dimmer 100 of the present embodiments may be connected to power sources of different voltage levels. For example, the dimmer 100 may be connected to a 120 Volt (V) 60 Hertz (Hz) AC mains residential power supply in the United States. The dimmer 100 may be also connected to a 230V 50 Hz AC mains power supply in Europe or a 277V 60 Hz commercial or industrial AC power supply in the United States. The dimmer 100 may include a user interface (not shown), such as an actuator, a button, a touch screen, or the like, which receives an input from a user to set the desired dimming level. According to another embodiment, the dimmer 100 may be controlled remotely as well, through a wired or wireless interface. The dimmer 100 may use this user input to produce dimmed hot output signal 102 to a connected load 103 at a particular voltage level corresponding to the desired dimming level. The load 103 may comprise an incandescent load, a light emitting diode (LED) load, or the like.

Figure 2:
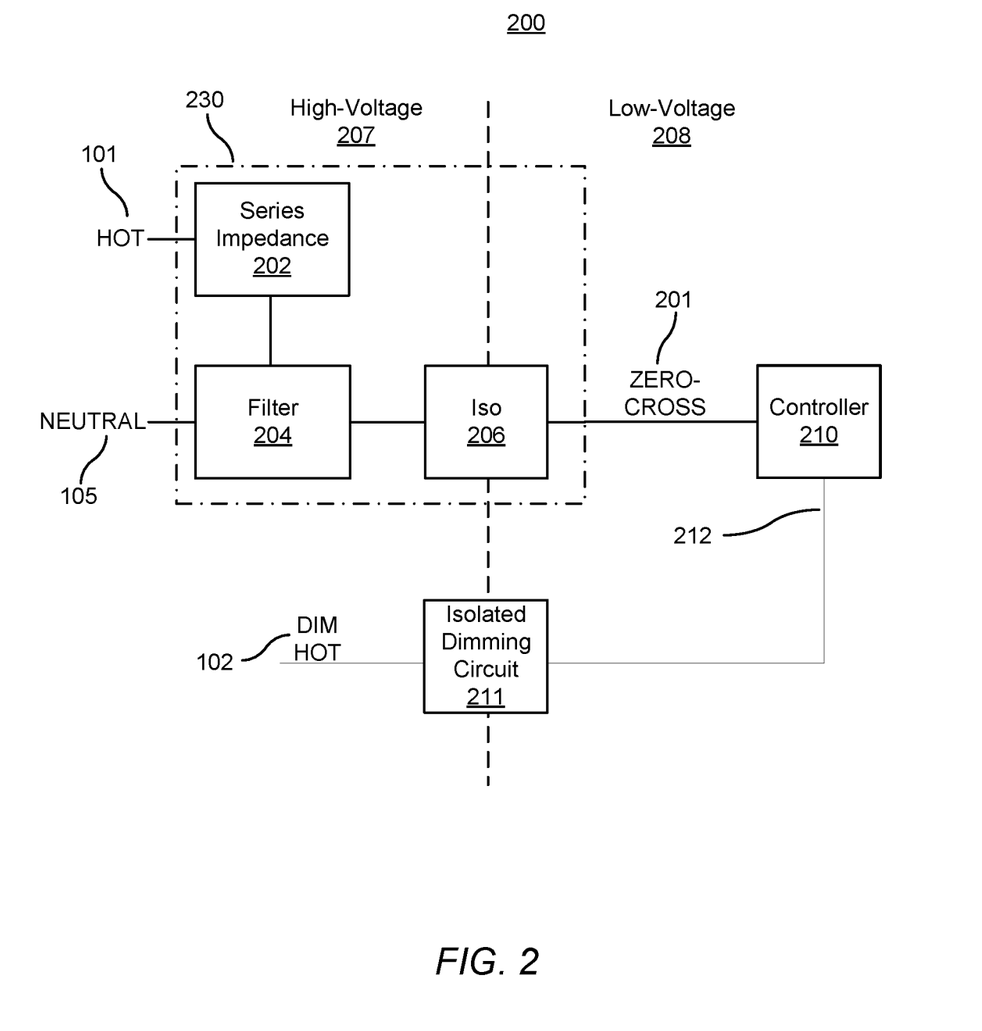
FIG. 2 shows a load control circuit of the dimmer in accordance with an illustrative embodiment.

Referring now to FIG. 2, there is shown a load control or dimmer circuit 200 of dimmer 100 according to an illustrative embodiment. The hot and neutral lines 101 and 105 of the AC power source 104 are connected to the input of the dimmer circuit 200. The dimmer circuit 200 may comprise a zero-cross detection circuit 230, a controller 210, and an isolated dimming circuit 211.

According to one embodiment, the zero-cross detection circuit 230 may generally comprise a series impedance 202, a low-pass filter 204, and an isolator 206. The series impedance 202 may comprise one or more resistors and/or capacitors in series. Filter 204 may comprise a low-pass filter including a resistor (R) capacitor (C) circuit to filter the incoming signal to attenuate signals with frequencies higher than a cutoff frequency. According to other embodiments, filter 204 may comprise a band pass filter including op-amps and comparators to do the signal filtering.

The filter 204 may be connected to the controller 210 through an isolator 206, such as an opto-isolator. The isolator 206 is configured for isolating the low-voltage side 208 of the dimmer circuit 200 from the high-voltage side 207 of dimmer circuit 200 for safety and to suppress electrical noise to protect the controller 210 from line-voltage fluctuations. Isolator 206 may comprise an optical isolator that isolates and transfers electrical signals between the high-voltage side 207 and the low-voltage side 208 using light. According to other embodiments, isolator 206 may comprise a digital isolator having a semiconductor based isolation barrier, an isolated digital field-effect transistor (FET) driver, or another type isolator known in the art. The isolator 206 outputs a zero-cross signal 201 that is received by the controller 210.

According to other embodiments, different types of zero-cross detection circuits may be utilized using other types of circuit components, such as ones that do not utilize an isolator. For example, the zero-cross detection circuit may comprise a resistor divider that connects to the base of a transistor. The transistor may turn on and off based on a threshold voltage level that is set by the resistor divider and as a result will output a zero-cross signal. The zero-cross signal may be sensed by the controller 210 to detect the pulse width delta to determine applied voltage and/or voltage dependent conditions.

The controller 210 may comprise at least one microprocessor, application specific integrated circuit (ASIC), standard logic, or any combinations thereof. Controller 210 can provide processing capability to provide processing for one or more of the techniques and functions described herein. The controller 210 may also comprise an internal memory, or be connected to an external memory, that can store data and executable code, such as volatile memory, nonvolatile memory, read-only memory (ROM), random-access memory (RAM), electrically erasable programmable read-only memory (EEPROM), flash memory, a hard disk drive, or other types of memory. The controller 210 may also include a wired or wireless interface configured for receiving remote control.

The controller 210 uses the zero-cross signal 201 to detect the incoming voltage and output an appropriate drive signal 212 to the isolated dimming circuit 211. According to various embodiments, the isolated dimming circuit 211 may comprise a Triode for alternating current (TRIAC) or dimming transistors, such as a pair of field-effect transistors (FET), or other types of dimming components. For example, the dimming transistors of the isolated dimming circuit 211 may receive the drive signal 212 from the controller 210 directing each of the transistors to be conductive or non-conductive for portion of each half-cycle of the AC power signal 101 to control the amount of power delivered to the connected load 103 as is known in the art.

The dimmer circuit 200 may comprise additional circuit components known in the art for providing additional functions to the dimmer 100. For example, the dimmer circuit 200 may comprise a power supply (not shown) for converting the incoming AC power signal to a direct current (DC) power signal for powering the various components of the dimmer circuit 200, including the controller 210. According to an embodiment, the input to the zero-cross detection circuit may be half wave rectified with a rectifier to save power.

Figure 3:
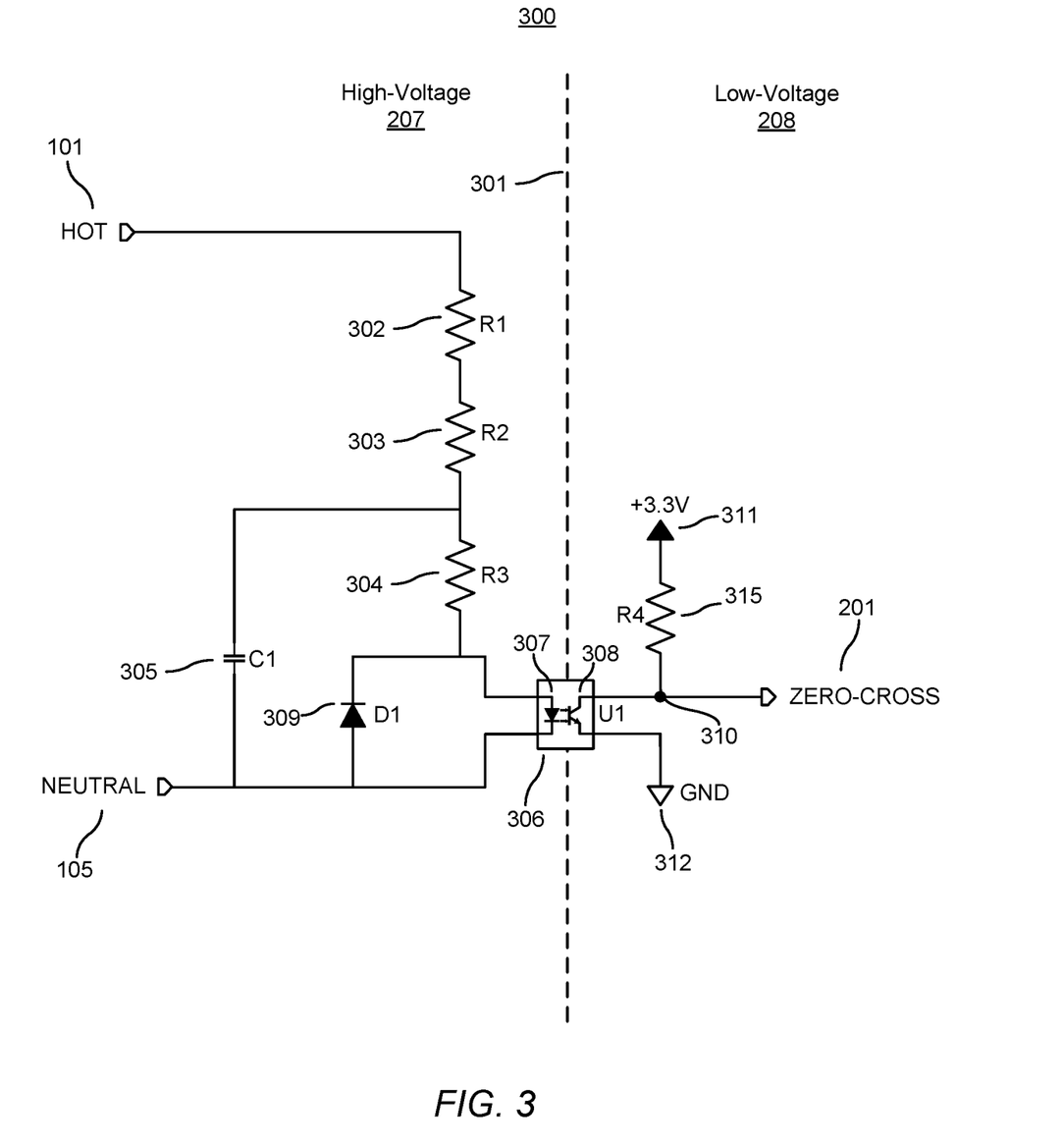
FIG. 3 shows an exemplary zero-cross detection circuit of the dimmer in accordance with an illustrative embodiment.
Figure 4A:
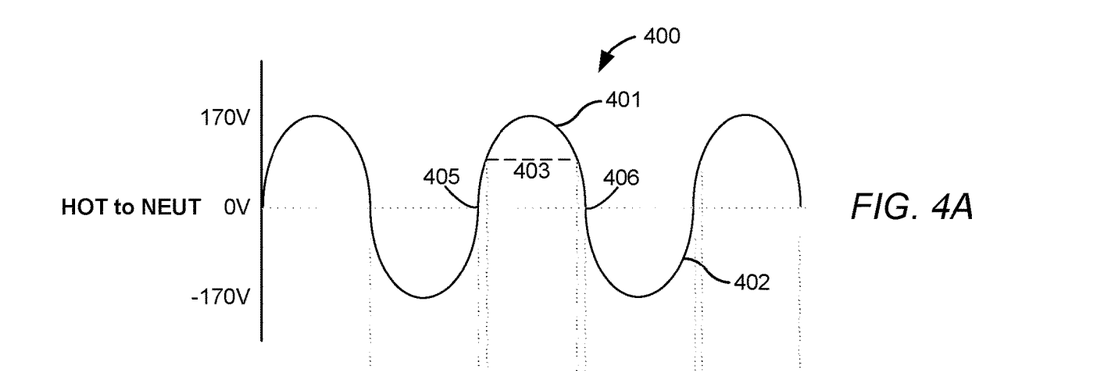
FIG. 4A shows an exemplary AC voltage waveform of the AC power hot signal applied to the dimmer in accordance with an illustrative embodiment.

FIG. 3 shows an exemplary zero-cross detection circuit 300 of the dimmer according to an illustrative embodiment. The circuit 300 comprises a pair of resistors R1 (302) and R2 (303) in series between hot 101 and neutral 105 to form the series impedance 202. The circuit 300 also comprises filter capacitor C1 (305) coupled in series with resistors R1 (302) and R2 (303) and in parallel with resistor R3 (304) to form the filter 204. The filter capacitor C1 (305) prevents perturbations on the line from being detected. Current flows from hot 101 to neutral 105 through the light emitting diode (LED) 307 of the opto-isolator 306 in the positive half cycle, and from neutral 105 to hot 101 through diode D1 (309) in the negative half cycle. Referring to FIG. 4A, there is shown an exemplary voltage waveform 400 of the AC power hot signal 101 of 120 VAC across hot 101 and neutral 105, showing a positive half cycle 401 and negative half cycle 402.

Referring back to FIG. 3, the isolator 206 may comprise an opto-isolator 306 comprising a light emitting diode (LED) 307 and a phototransistor 308 across a dielectric barrier 301. The LED 307 is coupled in series between resistor R3 (304) and neutral 105. A diode D1 (309) is coupled across of the opto-isolator 306 to protect the LED 307 against excessive reverse voltage. The current will flow through the LED 307 of the opto-isolator 306 during the positive half cycle 401 to turn on the phototransistor 308. The phototransistor 308 will turn on once the incoming voltage 400 reaches a voltage threshold value 403 (which is shown, in FIG. 4A, not to scale to better understand the present embodiments). The collector of the phototransistor 308 is coupled through an output pull-up voltage resistor R4 (315) to a low-voltage power source 311, for example of 3.3 V, and the emitter of the phototransistor 308 is coupled to ground 312. The controller 210 (not shown) is located on the low-voltage side 208 and is connected to the zero-cross output 310 between resistor R4 (315) and the collector of the phototransistor 308 to receive the zero-cross signal 201.

Figure 4B:
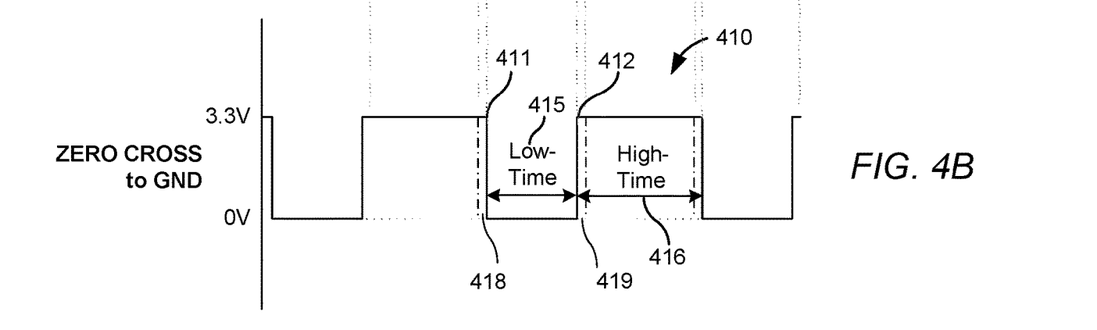
FIG. 4B shows an exemplary square voltage waveform of the zero-cross signal in accordance with an illustrative embodiment.

As shown in FIGS. 4A and 4B, at the rising edge of the positive half cycle 401, once the threshold voltage value 403 is reached at the incoming voltage 400, and thereby there is enough current flowing through the LED 307, the transistor 308 will turn on causing current to flow from collector to the emitter of the phototransistor 308 and pull down the zero-cross output 310 to ground 312. The controller 210 sensing the zero-cross signal 201 will detect this event as a rising edge zero-cross event. Referring to FIG. 4B, there is shown an exemplary square voltage waveform 410 of the zero-cross signal 201 illustrating the detected rising edge zero-cross event 411. Because the transistor 308 will only turn on once the voltage threshold value 403 is reached, the detected zero-cross event 411 is delayed from the actual zero-cross event 405 of the incoming voltage 400, resulting in additional high-time 418 at the zero-cross signal 201. The low-time 415 illustrates the time the phototransistor 308 is on.

When the voltage gets low enough at the trailing edge of the positive half cycle 401, i.e., when the incoming voltage 400 gets below the voltage threshold value 403, the current through the LED 307 will drop and the LED 307 will turn off. As a result, the phototransistor 308 will turn off and the zero-cross output 310 will go back up to 3.3 V. The controller 210 sensing the zero-cross signal 201 will detect this event as a falling zero-cross event 412 as illustrated in FIG. 4B. Because the transistor 308 will turn off when the incoming voltage 400 drops below the voltage threshold value 403, the detected zero-cross event 412 is detected ahead the actual zero-cross event 406 of the incoming voltage 400 resulting in an additional high-time 419 at the zero-cross signal 201. The high-time 416 illustrates the time the phototransistor 308 is off. As the incoming AC power hot signal 101 alternates, the zero-cross detection circuit 300 will continue to output the zero-cross signal 201 as illustrated by the square voltage waveform 410 at the frequency of the AC power hot signal 101, which is sensed by the controller 210 to detect the rising and falling zero-cross events.

As discussed above, the outputted zero-cross signal 201 as shown by waveform 410 can contain an advance or a delay in detection 411/412 of the actual zero-cross events 405/406 of the incoming voltage, resulting in an additional high-time 418 at the beginning of the positive half cycle 401 as well as an additional high-time 419 at the end of the positive half cycle 401. This zero-cross advance or delay 411/412 in each circuit would vary depending on the applied voltage, the type of zero-cross detection circuit that is being used, the circuit's component values, and the edge that is being observed. In each circuit there can be both fixed zero-cross detection delays and voltage dependent zero-cross detection delays, both of which need to be accounted for. In circuit 300, for example, the fixed zero-cross delays are caused by the filter 204 (RC circuit) and propagation delays in the opto-isolator 306. Voltage dependent zero-cross detection delays on the rising zero-cross 405 of the AC voltage waveform 400 are caused by the series impedance 302-304, the voltage threshold value 403 needed for the LED 307 to conduct in the opto-coupler 306, and the energy transfer needed to turn on phototransistor 308 to draw enough current through the impedance 315 to have the Controller 210 detect the zero-cross signal 201 as low. Similarly, voltage dependent zero-cross detection advance on the falling zero-cross 406 of the AC voltage waveform 400 are caused by the series impedance 302-304, the voltage threshold value 403 needed for the LED 307 to stop conduction in the opto-coupler 306, and the energy transfer reduction needed to turn off phototransistor 308 to stop current flowing through the impedance 315 enough to have the Controller 210 detect the zero-cross signal 201 as high. With different amplitudes of the AC voltage waveform 400 applied, the voltage variation over time (dV/dt) that occurs at the zero-cross events gets steeper or shallower. This will affect the voltage dependent zero-cross detection delay/advance 411/412 from the actual zero-cross event 405/406 of the applied AC voltage waveform 400. The controller 210 may compare the low-time 415 to the high-time 416 to determine the pulse width difference or delta and use it to determine the voltage and/or voltage dependent conditions of the circuit, including the zero-cross delay, as discussed in greater detail below.

In a dimmer application, since the dimmer 100 turns power on or off to the load based on these zero-cross events, to generate the reverse or forward phase signals shown in FIGS. 6A and 6B, the dimmer 100 of the present embodiments may be adapted to account for the correct zero-cross delay based on the applied voltage. Thus, the dimmer 100 of the present embodiments can maintain substantially consistent dimming timing with the incoming AC power signal 101 regardless of the applied voltage level. Thus, the dimmer 100 of the present embodiments can accommodate various voltage applications, such as 120V all the way up to 277V. This allows the same dimmer to be used in residential, commercial, or international installations.

Figure 5A:
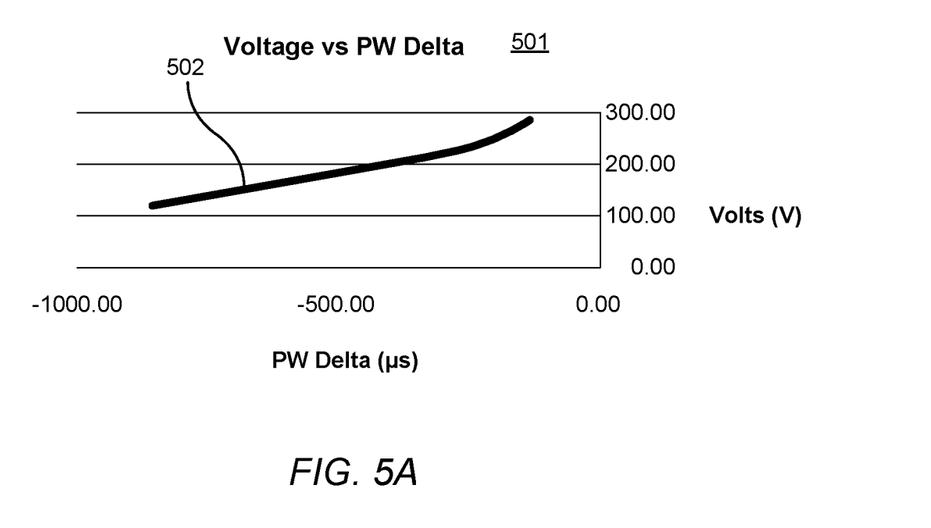
FIG. 5A shows an exemplary graph illustrating the relationship between pulse width delta and the applied voltage in accordance with an illustrative embodiment.

Referring to FIG. 5A, there is shown a graph 501 showing an exemplary relationship 502 between the voltage and the pulse width delta (i.e., high-time 416 minus low-time 415) for a 50 Hz input signal at different voltage levels determined via simulation of the circuit. As shown, the relationship between the pulse width delta and line voltage at a particular frequency is substantially linear with a small error. The controller 210 may sense the zero-cross signal 201 to detect the pulse width delta and use it to determine the voltage applied to the dimmer 100.

The controller 210 may store the relationship between the frequency, pulse width delta, and incoming voltage. According to one embodiment, the frequency can be incorporated into a formula to account for different frequencies. The controller 210 may first determine the frequency of the incoming voltage by measuring the time between two consecutive rising zero-cross events or two consecutive falling zero-cross events of the zero-cross signal 201. The controller 210 may then determine the pulse width delta by subtracting the low-time from the high-time of zero-cross signal 201. The controller 210 may then plug in the frequency and the pulse width delta into the formula to determine the voltage.

According to another embodiment, the controller 210 may store a look up table representing the relationship between different specific frequencies, incoming voltage, and pulse width delta.

According to yet another embodiment, the controller 210 may store a plurality of formulas, each as a function of pulse width delta and voltage for each specific frequency. For example, two separate formulas can be stored for 50 Hz and 60 Hz incoming frequencies. Once the controller 210 determines the frequency of the zero-cross signal 201, the controller 210 may choose an appropriate formula based on the determined frequency, determine the pulse width delta from the zero-cross signal 201, and calculate the incoming voltage using the chosen formula and the determined pulse width delta. According to an embodiment, the controller 210 may use the following linear formula for a particular frequency to determine the voltage based on the detected pulse width delta:

$$\text{Volts} = V\_\text{Slope} \times PW\_\text{Delta} + V\_\text{Offset} \qquad \text{Formula 1}$$

where,

PW_Delta is the difference between the detected high-time and low-time of the zero-cross signal 410;

V_Slope is the slope coefficient of the linear relationship between the voltage and the PW_Delta;

V_Offset is the constant offset value of the linear relationship between the voltage and the PW_Delta.

The slope and constant offset values of this formula are specific and related to the type of zero-cross detection circuit used, as well as the values of the circuit components, such as the filter type and type of isolator (if any), used in the zero-cross detection circuit 230/300. For different circuit component types and values, the slope and the constant offset values will change. For example, as determined by simulation, for a circuit 300 that uses the following values R1-3=27 kΩ, R4=43 kΩ, and C1=0.01 μF, the slope is 0.21 μs/V and the constant offset is 294 volts.

According to one embodiment, the formula used to determine the voltage based on frequency and pulse width delta, including the slope and constant offset value, may be calculated based on the particular component values of the zero-cross detection circuit. According other embodiments, the formula may be derived by testing or simulating the zero-cross detection circuit. For example, the slope and constant offset can be determined by running or simulating the particular zero-cross detection circuit 230/300, finding data points at several voltages, plotting the data points and finding the resulting slope and constant offset value. The determined slope and content offset values can be then stored by the controller 210. Using the formula and the stored slope and constant offset values the controller 210 may directly calculate the incoming voltage.

Figure 7:
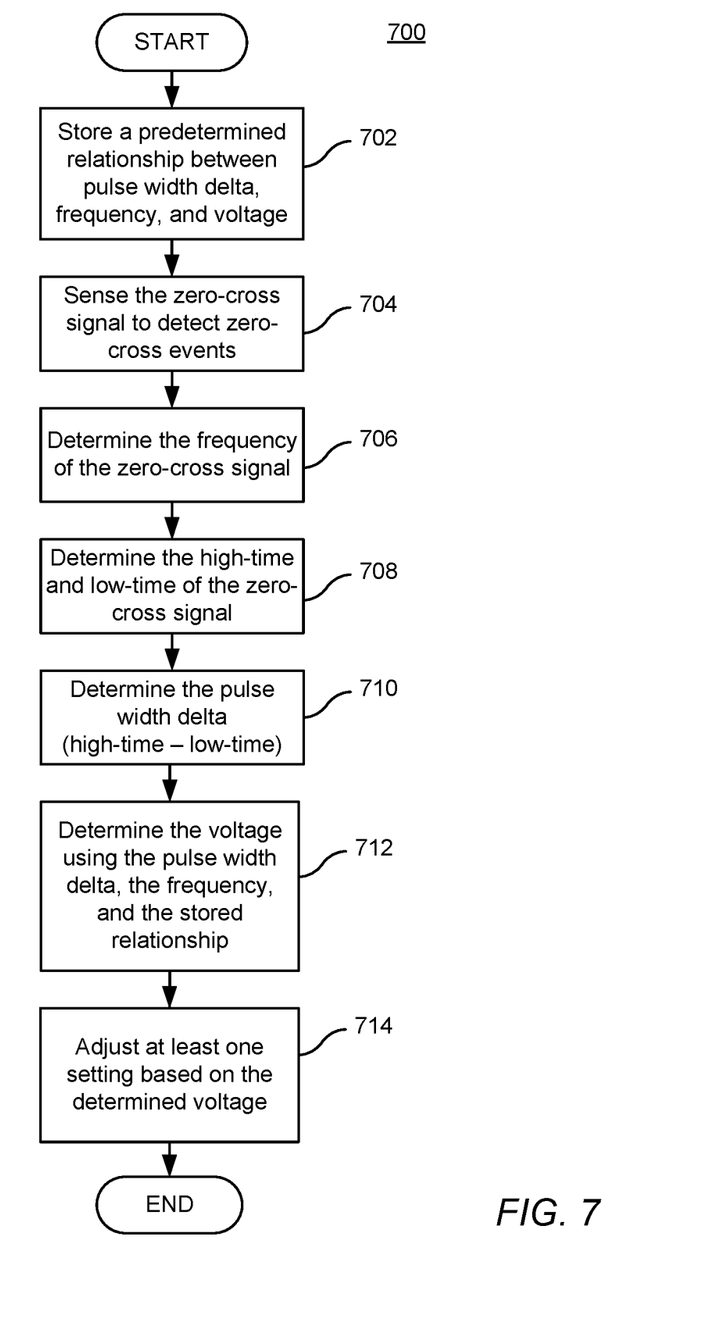
FIG. 7 shown a flowchart illustrating the steps for a method of determining the voltage applied to a device circuit, such as a dimmer circuit, in accordance with an illustrative embodiment.

Referring to FIG. 7, there is shown a flowchart 700 illustrating the steps for a method of determining the voltage applied to a circuit, such as the dimmer 100. According to an embodiment, the dimmer 100 may determine the incoming voltage and adjust at least one of its settings after the dimmer is installed, by an installer manually triggering a setup mode via the user interface of the dimmer 100. According to another embodiment, the dimmer 100 may determine the incoming voltage and adjust at least one of its settings automatically at each startup, every time after power is removed from the dimmer 100 (for example due to power outage or circuit breaker trip or turn off, disconnecting an airgap switch of the dimmer, or the like), or anytime during operation.

In step 702, the controller 210 stores a predetermined relationship between the pulse width delta, frequency, and voltage, which is determined based on the type and component values of the zero-cross detection circuit 230/300 as discussed above. The relationship can be stored in the form of a formula (e.g., Formula 1), a table, or the like, or any combinations thereof. Step 702 is performed and implemented during product manufacturing.

After installation, in step 704, the controller 210 may sense the zero-cross signal to detect zero-cross events, as discussed above. In step 706, the controller 210 determines the frequency of the AC power line by measuring the frequency of the zero-cross signal coming in. In step 708, the controller 210 determines the high-time and the low-time of the zero-cross signal based on the detected zero-cross events. Then in step 710, the controller 210 determines the pulse width delta by determining the difference between the high-time and the low-time. The controller 210 then determines the applied voltage using the determined pulse width delta, the determined frequency, and the stored relationship between the pulse width delta, frequency, and voltage in step 712. Finally, in step 714, the controller 210 may adjust at least one setting based on the determined applied voltage.

As discussed above, the controller 210 may use the determined voltage to adjust the timing of the isolated dimming circuit 211. The controller 210 may store different zero-cross delay values it has to take into account for different determined voltages. However, in addition to controlling the timing of the dimmer, the detected voltage can be used in other ways, such as for protecting the load, for adjusting the rise and fall times of the dimmer FET, as well as other dimmer functions. For example, one type of dimmer 100 may be able to be connected to 277V without being damaged, but can only properly dim voltages up to 120 V, In such a case, the controller 210 may determine that the dimmer 100 is connected to a voltage which is not supported, for example it is installed in a 277 V installation. The controller 210 may in response not dim the load and/or issue an error signal. Detecting the voltage can also help to protect the dimmer 100 from over voltage in the event of a broken neutral connection in a multi-phase installation.

The controller 210 may also use the detected voltage value to adjust overcurrent trip threshold values. The dimmer may have a function where the dimmer shuts off when it reaches a specified load current, or it may limit the load current. The current limit may be lower at higher line voltages. Using the determined voltage value, the current limit for the dimmer circuit may be determined. For example, for an incoming 120 V AC power hot signal the current limit may be set for 12 amps, and for 277V AC power hot signal the current limit be set for 6 amps.

Figure 5B:
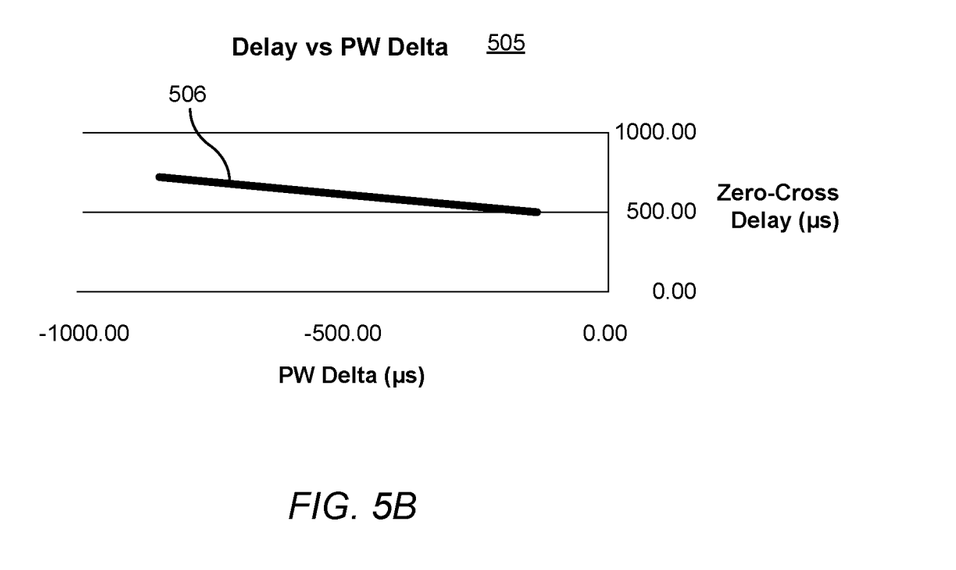
FIG. 5B shows an exemplary graph illustrating the relationship between pulse width delta and the zero-cross delay (i.e., the time between the rising edge of the AC waveform 400 and the falling edge of the zero cross waveform 410) at different voltage levels in accordance with an illustrative embodiment.

Instead of detecting the voltage, the present embodiments can also be used to directly detect voltage dependent conditions. For example, while the zero-cross delays vary based on the applied voltage and frequency, these zero-cross delays may also be calculated from the pulse width delta directly, without determining frequency and bypassing the voltage calculation. Referring to FIG. 5B, there is shown a graph 505 showing an exemplary relationship 506 between the zero-cross delay in microseconds (µs) (i.e., the time between the rising edge of the AC waveform 400 and the falling edge of the zero cross waveform 410) and the pulse width delta (i.e., high-time minus low-time of zero-cross waveform 410) at different voltage levels determined via simulation of an exemplary circuit 300. As shown, the relationship between the pulse width delta and the zero-cross delay at various line voltage levels is substantially linear with a small error. According to an embodiment, the controller 210 may use the following linear formula to determine the zero-cross delay it needs to account for based on the detected pulse width delta:

$$\text{Zero-Cross Delay} = D\_Slope \times PW\_Delta + D\_Offset \quad \text{Formula 2}$$

where,
PW_Delta is the difference between the detected high-time and low-time of the zero-cross signal 410;
D_Slope is the slope coefficient of the linear relationship between the zero-cross delay and the PW_Delta;
D_Offset is the constant offset value of the linear relationship between the zero-cross delay and the PW_Delta.

The slope and constant offset values of this formula are specific and related to the type of zero-cross detection circuit used, as well as the values of the circuit components used in the zero-cross detection circuit 230/300. For example, the slope and constant values would vary depending on the type of filter and isolator (if any) that are being used, as well as their chosen values, including for example, the values of the series resistors R1 (302), R2 (303), and R3 (304), the values of the filter capacitor C1 (305) on the optocoupler input, the optocoupler current transfer ratio (CTR), and the value of the output pull up voltage resistor R4 (315). For example, as determined by simulation, for a circuit 300 that uses the following values R1-3=27 kΩ, R4=43 kΩ, and C1=0.01 µF, the slope is −0.3 µs zero-cross delay/µs delta and the constant offset is 470 microseconds. For different circuit component types and values the formula will be different.

According to an embodiment, the formula may be derived based on the components types and values of the zero-cross detection circuit, by testing the zero-cross detection circuit, by simulating the zero-cross detection circuit, or the like. The determined relationship between the pulse width delta and the zero-cross delay can be stored by the controller 210. For example, using the linear formula above and the stored slope and constant offset values, the controller 210 may determine the zero-cross delay and account for the zero-cross delay during dimming. For example, if the zero-cross is delayed by 300 microseconds, and the controller 210 wants to dim at exactly 1 milliseconds into the half cycle, the controller 210 will deduct the 300 microseconds and will wait 700 microseconds from the detected zero-cross to dim instead.

Figure 8:
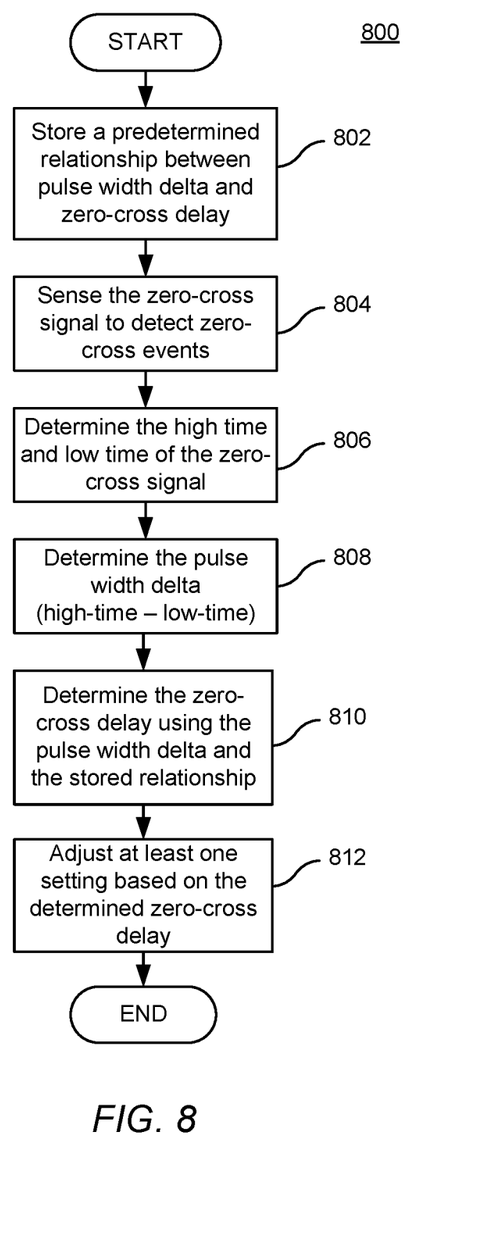
FIG. 8 shows a flowchart illustrating the steps for a method of determining a voltage dependent condition, and more specifically a zero-cross delay, of a device circuit, such as a dimmer circuit, in accordance with an illustrative embodiment.

Referring to FIG. 8, there is shown a flowchart 800 illustrating the steps for a method of determining the zero-cross delay and in response adjusting at least one setting of the dimmer, such as the dimmer timing. According to an embodiment, the dimmer 100 may determine the zero-cross delay during the dimmer setup or each time at startup, as discussed above.

In step 802, the controller 210 stores the predetermined relationship between the pulse width delta and zero-cross delay, which is determined based on the type and component values of the zero-cross detection circuit 230/300 as discussed above. The relationship can be stored in the form of a formula with predetermined slope and constant values (e.g., Formula 2), a table, or the like, or any combination thereof. Step 802 is performed and implemented during product manufacturing.

In step 804, after installation, the controller 210 may sense the zero-cross signal to detect zero-cross events, as discussed above. In step 806, the controller 210 determines the high-time and the low-time of the zero-cross signal based on the detected zero-cross events. Then in step 808 the controller 210 determines the pulse width delta by determining the difference between the high-time and the low-time. The controller 210 then determines the zero-cross delay using the determined pulse width delta and the stored relationship between the pulse width delta and the zero-cross delay in step 810, for example by plugging in the determined pulse width delta into Formula 2. Finally, in step 812, the controller 210 may adjust at least one dimmer setting, such as the timing of the dimmer, based on the determined zero-cross delay.

While FIG. 8 refers to determining the zero-cross delay, it should be understood that other relationships, including formulas and/or tables, may be derived between the pulse width delta and other voltage dependent conditions to detect the voltage dependent conditions and as a result adjust at least one circuit settings.

INDUSTRIAL APPLICABILITY

The disclosed embodiments provide a system, software, and a method for automatically detecting the voltage applied to a dimmer and/or voltage dependent conditions. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced with different details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A dimmer circuit adapted to operate at different applied voltage levels, comprising:
   a zero-cross detection circuit adapted to output a zero-cross signal comprising zero-cross events based on an applied alternating current power signal, wherein the zero-cross signal comprises a low-time period between two adjacent zero-cross events during which the zero-cross signal is at a low value and a high-time period between another two adjacent zero-cross events during which the zero-cross signal is at a high value;
   a dimming circuit adapted to provide a dimmed hot output signal to a load; and
   a controller adapted to:
      store a relationship between a pulse width delta and a zero-cross delay;
      receive the zero-cross signal from the zero-cross detection circuit;
      determine a pulse width delta by calculating a difference between a high-time and a low-time of the zero-cross signal;
      determine a zero-cross delay based on the determined pulse width delta and the stored relationship between the pulse width delta and zero-cross delay; and
      adjust at least one setting of the dimming circuit based on the determined zero-cross delay.

2. The dimmer circuit of claim 1, wherein the zero-cross detection circuit comprises a series impedance, a low-pass filter, and an isolator.

3. The dimmer circuit of claim 1, wherein the zero-cross detection circuit comprises at least one capacitor, at least one resistor, and an optical isolator.

4. The dimmer circuit of claim 1, wherein the zero-cross detection circuit comprises at least one capacitor, at least one resistor, and a comparator.

5. The dimmer circuit of claim 1, wherein the zero-cross detection circuit comprises an opto-isolator including a light emitting diode and a phototransistor, wherein the light emitting diode is connected to a series impedance and a low-pass filter, wherein a collector of the phototransistor is connected to a pull up resistor and to the controller to provide the zero-cross signal.

6. The dimmer circuit of claim 1, wherein the stored relationship between pulse width delta and zero-cross delay is substantially linear.

7. The dimmer circuit of claim 6, wherein the stored relationship comprises the following formula:
Zero-Cross Delay=D_Slope×PW_Delta+D_Offset where,
PW_Delta is the pulse width delta;
D_Slope is a slope coefficient; and
D_Offset is the constant offset value.

8. The dimmer circuit of claim 6, wherein the stored relationship between pulse width delta and zero-cross delay is predetermined based on the types and values of the zero-cross detection circuit components.

9. The dimmer circuit of claim 1, wherein the stored relationship between pulse width delta and zero-cross delay is stored as one of a formula, a table, and any combinations thereof.

10. The dimmer circuit of claim 1, wherein the at least one setting comprises a timing of the dimmer circuit.

11. A circuit adapted to determine a voltage level of an applied alternating current power signal, comprising:
a zero-cross detection circuit adapted to output a zero-cross signal comprising zero-cross events based on an applied alternating current power signal, wherein the zero-cross signal comprises a low-time period between two adjacent zero-cross events during which the zero-cross signal is at a low value and a high-time period between another two adjacent zero-cross events during which the zero-cross signal is at a high value; and
a controller adapted to:
store a relationship between a pulse width delta, a frequency, and a voltage;
receive the zero-cross signal from the zero-cross detection circuit;
store or determine a frequency of the zero-cross signal;
determine a pulse width delta by calculating a difference between a high-time and a low-time of the zero-cross signal; and
determine an applied voltage based on the determined pulse width delta, the stored or determined frequency, and the stored relationship between pulse width delta, frequency, and voltage.

12. The circuit of claim 11, wherein the zero-cross detection circuit comprises a series impedance, a low-pass filter, and an isolator.

13. The circuit of claim 11, wherein the zero-cross detection circuit comprises at least one capacitor, at least one resistor, and an optical isolator.

14. The circuit of claim 11, wherein the zero-cross detection circuit comprises at least one capacitor, at least one resistor, and a comparator.

15. The circuit of claim 11, wherein the zero-cross detection circuit comprises an opto-isolator including a light emitting diode and a phototransistor, wherein the light emitting diode is connected to a series impedance and a low-pass filter, wherein a collector of the phototransistor is connected to a pull up resistor and the controller to provide the zero-cross signal.

16. The circuit of claim 11, wherein the stored relationship between pulse width delta, frequency, and voltage comprises a plurality of formulas each for a predetermined frequency and each comprising a function of pulse width delta and voltage.

17. The circuit of claim 16, wherein the controller is adapted to choose a formula from the plurality of formulas based on the stored or determined frequency and calculate the applied voltage using the chosen formula and the determined pulse width delta.

18. The circuit of claim 16, wherein each formula comprises a relationship between pulse width delta and voltage that is substantially linear.

19. The circuit of claim 16, wherein each formula for each predetermined frequency comprises:
Applied Voltage=V_Slope×PW_Delta+V_Offset where,
PW_Delta is the pulse width delta;
V_Slope is the slope coefficient;
V_Offset is the constant offset value.

20. The circuit of claim 16, wherein each formula is predetermined based on the types and values of the zero-cross detection circuit components.

21. The circuit of claim 11, wherein the stored relationship between pulse width delta, frequency, and voltage is stored as one of a formula, a plurality of formulas, a table, and any combinations thereof.

22. The circuit of claim 11, wherein the controller is further adapted to adjust at least one setting of the circuit based on the determined voltage level.

23. The circuit of claim 22, wherein the at least one setting comprises timing of the circuit.

24. The circuit of claim 22, wherein adjusting at least one setting further comprises determining whether the determined voltage level is supported by the circuit.

25. The circuit of claim 24, wherein when the determined voltage level is not supported by the circuit, the controller is adapted to (a) disable an operation of the circuit, or (b) issue an error signal.

26. The circuit of claim 22, wherein the at least one setting comprises an overcurrent trip threshold value.

27. The circuit of claim 22, wherein the at least one setting comprises a current limit of the circuit.

28. The circuit of claim 22, wherein the at least one setting comprise a rise time and a fall time of the circuit.

29. A circuit adapted to determine a voltage dependent condition value based on an applied alternating current power signal, comprising:
a zero-cross detection circuit adapted to output a zero-cross signal comprising zero-cross events based on an applied alternating current power signal, wherein the zero-cross signal comprises a low-time period between two adjacent zero-cross events during which the zero-cross signal is at a low value and a high-time period between another two adjacent zero-cross events during which the zero-cross signal is at a high value; and
a controller adapted to:
store a relationship between a pulse width delta and a voltage dependent condition;
receive the zero-cross signal from the zero-cross detection circuit;
determine a frequency of the zero-cross signal;
determine a pulse width delta by calculating a difference between a high-time and a low-time of the zero-cross signal; and
determine a voltage dependent condition value based on the determined pulse width delta and the stored relationship between pulse width delta and voltage dependent condition.

30. A circuit adapted to operate at different applied voltage levels, comprising:
a zero-cross detection circuit adapted to output a zero-cross signal comprising zero-cross events based on an applied alternating current power signal, wherein the zero-cross signal comprises a low-time period between two adjacent zero-cross events during which the zero-cross signal is at a low value and a high-time period between another two adjacent zero-cross events during which the zero-cross signal is at a high value;

a controller adapted to:
store a relationship between a pulse width delta and a zero-cross delay;
receive the zero-cross signal from the zero-cross detection circuit;
determine a pulse width delta by calculating a difference between a high-time and a low-time of the zero-cross signal;
determine a zero-cross delay based on the determined pulse width delta and the stored relationship between the pulse width delta and zero-cross delay; and
adjust at least one setting of the circuit based on the determined zero-cross delay.

\* \* \* \* \*